United States Patent
Quinn

(10) Patent No.: US 6,921,245 B2
(45) Date of Patent: Jul. 26, 2005

(54) COAXIAL SEAL FOR A PUMP

(75) Inventor: Joel Quinn, South Jordan, UT (US)

(73) Assignee: Envirotech Pumpsystems, Inc., Salt Lake City, UT (US)

( * ) Notice: Subject to any disclaimer, the term of this patent is extended or adjusted under 35 U.S.C. 154(b) by 195 days.

(21) Appl. No.: 10/364,734

(22) Filed: Feb. 11, 2003

(65) Prior Publication Data

US 2004/0156711 A1 Aug. 12, 2004

(Under 37 CFR 1.47)

(51) Int. Cl.$^7$ ................................................ F01D 11/08
(52) U.S. Cl. .................................. 415/173.1; 415/174.2
(58) Field of Search ........................... 415/170.1, 171.1, 415/172.1, 173.1, 174.2

(56) References Cited

U.S. PATENT DOCUMENTS

| | | | |
|---|---|---|---|
| 3,614,256 A | | 10/1971 | Sieghartner |
| 3,892,498 A | | 7/1975 | Jacuzzi et al. |
| 4,439,096 A | * | 3/1984 | Rockwood et al. ......... 415/131 |
| 4,538,959 A | * | 9/1985 | Cantor et al. ................. 415/98 |
| 4,840,384 A | | 6/1989 | Dorsch |
| 4,946,349 A | | 8/1990 | Manabe et al. |
| 5,217,350 A | | 6/1993 | Kimura et al. |
| 5,531,564 A | * | 7/1996 | Anttonen et al. ........... 415/104 |
| 5,871,332 A | * | 2/1999 | Gray et al. .............. 415/170.1 |
| 6,098,988 A | | 8/2000 | Kawakami et al. |
| 6,234,748 B1 | * | 5/2001 | Brown et al. ............. 415/170.1 |

OTHER PUBLICATIONS

"Rock V.I.T. and Hermetaseal Chemical Process Pumps" Technical Data Bulletin 100.5B for Environamics.

* cited by examiner

Primary Examiner—Hoang Nguyen
(74) Attorney, Agent, or Firm—Morriss O'Bryant Compagni, P.C.

(57) ABSTRACT

A sealing mechanism for a fluid pump comprises first and second seal members which are coaxially and radially oriented relative to each other, and are positioned between the rotating and non-rotating elements of the fluid pump to maintain a competent seal which is simple to assembly, maintain and repair or replace, and which also improves pump operation when compared to known sealing mechanisms for fluid pumps.

18 Claims, 3 Drawing Sheets

COAXIAL SEAL FOR A PUMP

BACKGROUND OF THE INVENTION

1. Field of the Invention

This invention relates to sealing systems for industrial pumps and specifically relates to a simplified coaxial seal system for rotary fluid pumps.

2. Description of the Related Art

Rotary fluid pumps generally comprise a rotating element, such as an impeller or a rotor, housed within a stationary pump casing. Sealing means are provided between the rotating element and stationary elements of the pump to prevent fluid from infiltrating between the rotating and stationary elements. The type and configuration of sealing means varies widely between types and manufacture of fluid pumps. While it has been known to employ gas as a means of providing a "sealless" sealing systems, most liquid pumps employ mechanical seals.

Sealing assemblies or mechanisms of industrial fluid pumps comprise a sealing element which rotates with the rotating element of the pump and another sealing element which is associated with the stationary elements of the pump, and is, likewise, stationary. Thus, the sealing elements contact each other in a seated arrangement with one sealing element moving relative to the other. As a consequence of the relative movement between the sealing elements, the sealing elements become worn over time and eventually fail. The seal assembly must then be replaced, which usually involves taking the pump off-line, taking the pump apart and replacing the seal assembly or elements of it. Given the complex configuration of known sealing mechanisms or assemblies, the removal and replacement of the seal members is usually very time-consuming and expensive.

In many types of pumps, the seal members are axially aligned adjacent or near each other. Such "in-line" sealing arrangements usually require a significant number of parts, including sealing rings and locking nuts, to produce the desired sealing competency. Additionally, such sealing systems require a significant amount of manpower to assemble and/or to replace the sealing mechanism because the seals and ancillary sealing elements must be properly adjusted and aligned within the pump to assure the integrity of the seal. If the sealing elements are not properly installed, adjusted and aligned, the net pump suction head (NPSH) can be adversely affected, thereby reducing the efficiency of the pump, and the life of the seal can be adversely affected.

Thus, it would be advantageous in the art to provide a seal assembly for a fluid pump which is simply configured, of preferably few parts, and is simple to install, maintain and repair or replace, while providing a competent fluid seal in the pump.

BRIEF SUMMARY OF THE INVENTION

In accordance with the present invention, a seal assembly for a fluid pump of the rotary type is configured with coaxially and radially oriented seal members which are easily installed and which do not require any adjustment or alignment. The seal assembly of the present invention may be used in a variety of types of rotary pumps, but is described herein with respect to use in centrifugal pumps of the pitot tube type by way of example only.

The seal assembly of the present invention comprises two seal members which are coaxially aligned and radially oriented relative to each other, in contrast to known fluid pump seal mechanisms. That is, prior art seal mechanisms typically comprise several separate elements, one or more of which must be aligned and adjusted by a skilled workman, which introduces significant costs and time in assembling and servicing the pump. Prior art seal mechanisms also comprise seal members which are coaxial, but which are axially aligned in end-to-end or near adjacent arrangement to each other to produce an "in-line" orientation of the seal members. As such, in-line seal members make the sealing mechanism greater in length and result in a longer fluid inlet. Undesired increases in the available net pump suction head (NPSH) of the pump may result, which can reduce the efficiency of the pump.

The coaxial and radial orientation of the seal members of the present invention provides a simplified sealing assembly which does not require skilled manpower to install or align, and enables simple and relatively quick maintenance of the pump when the seal assembly requires repair or replacement. Moreover, because the seal members of the present invention are radially oriented, the axial length of the seal assembly is shorter than known seal assemblies and the fluid inlet may be correspondingly shorter. Improvements in pump efficiency may be observed.

The shorter axial length of the seal assembly of the present invention also enables the overall length of the pump to be shorter. Therefore, the cost of manufacturing the pump is less due to less materials and fewer components being required for construction of the pump, and the pump can be used in a greater variety of pumping applications than known larger pumps. These and other advantages of the present invention will become more apparent with consideration of the detailed description which follows.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
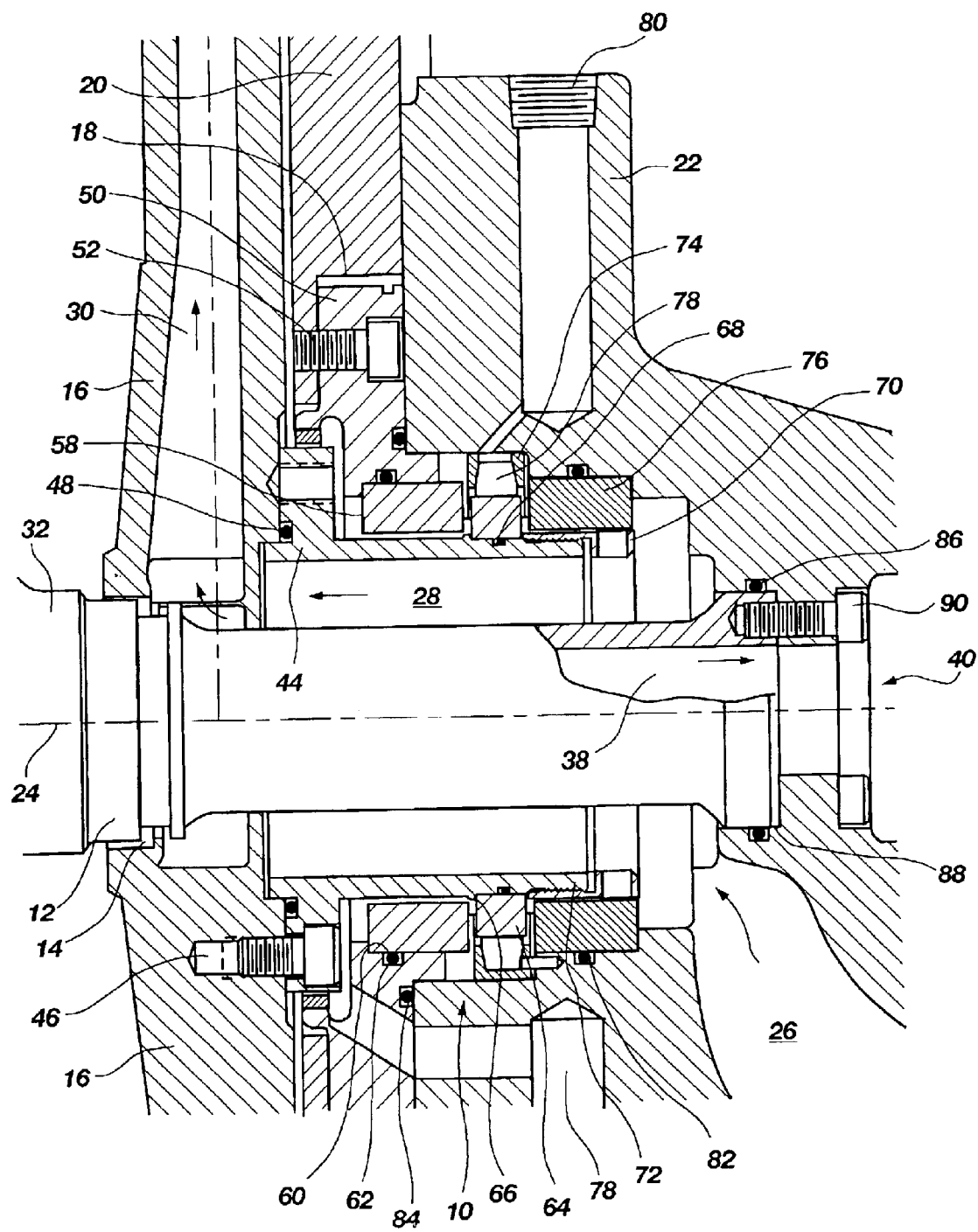
FIG. 1. is a view in cross section of a portion of a pitot tube pump of the prior art illustrating a conventional, in-line seal assembly in common use.

FIG. 1 illustrates a portion of a centrifugal pump of the pitot tube type which is known in the prior art. The basic elements of a centrifugal pump of the pitot tube type are well-known in the art as exemplified by, for example, U.S. Pat. No. 4,280,790, the contents of which are incorporated herein by reference. Although details of pitot tube pump structure are not illustrated herein because they are well known in the art, it is nonetheless instructive to the understanding of the present invention to note that pitot tube pumps generally comprise a pump casing that houses a rotating casing, or rotor, through which is positioned a stationary pitot tube assembly having a pitot tube arm. In operation, fluid enters into a fluid inlet formed in the pump casing and around the pitot tube assembly, and then enters into the rotor. The fluid is spun to the periphery of the rotor where it encounters an inlet opening in the pitot tube and flows from the inlet of the pitot tube through the pitot tube assembly to an outlet of the pump.

In FIG. 1, which specifically illustrates the structure and positioning of a sealing mechanism, generally at 10, in a known pitot tube construction, the pitot tube assembly 12 is positioned through an opening 14 in the rotor cover 16 of the rotor casing (not shown), through an opening 18 in the end bell 20 of the pump casing and through a manifold 22 attached to the end bell 20. The pitot tube assembly 12 is coaxially aligned with the center line 24 of the pump.

In operation, fluid enters the pump through an inlet 26 in the manifold 22 and flows through an annular space 28 surrounding the pitot tube assembly 12. From the annular space 28 the fluid flows into radially-oriented channels 30 formed in the rotor cover 16. Under the spinning action of the rotor, fluid is forced to the periphery of the rotor where it encounters an inlet opening (not shown) in the pitot tube arm 32. Fluid enters the pitot tube arm 32 and into a central channel 38 (revealed by the cutaway portion of the pitot tube assembly 12) from where the fluid exits the pump through a fluid outlet 40 formed in the manifold 22.

The sealing mechanism 10 illustrated in FIG. 1 is positioned between the rotating elements of the pump, namely the rotor cover 16, and the stationary elements of the pump, namely the end bell 20 and manifold 22, to isolate the pump casing from infiltration of fluid. The sealing mechanism 10 of FIG. 1, which is representative of many conventional prior art seal assemblies, comprises a seal hub 44 that is positioned about the pitot tube assembly 12 to provide the inner diameter of the annular space 28. The seal hub 44 is secured to the rotor cover 16 by screws 46. An o-ring 48 is positioned between the seal hub 44 and the rotor cover 16 to prevent fluid from infiltrating between the sealing mechanism 10 and the rotor cover 16. A seal plate 50 is next positioned over and about the seal hub 44 and is secured to the end bell 20 by means such as screws 52.

A ring-shaped first seal head 58 is next positioned within an annulus 60 of the seal plate 50 and about the seal hub 44. The seal plate 50 axially and radially positions the first seal head 58. An o-ring 62 is positioned between the first seal head 58 and the seal plate 50. A seal mating ring 64 is positioned about and against the outwardly extending flange portion 66 of the seal hub 44. An o-ring 68 is positioned between the seal mating ring 64 and the seal hub 44. A seal hub nut 70 is next positioned about the terminal end 72 of the seal hub 44 and is threadingly secured to the seal hub 44 to aid in securing the seal mating ring 64 in position against the seal hub 44.

A diffuser ring 74 is positioned between the first seal head 58 and a second seal head 76. The diffuser ring 74 is configured with an inner annular channel 78 that is positioned to receive flushing fluid introduced to the sealing mechanism 10 through a seal flush bore 80 formed through the manifold 22. The flushing fluid is distributed by the diffuser ring 74 to elements of the sealing mechanism 10 to keep the sealing mechanism 10 cooled and lubricated during operation of the pump.

The second ring-shaped seal head 76 is positioned circumferentially about the seal hub nut 70 and adjacent the diffuser ring 74. The diffuser ring 74 maintains the second seal head 76 in axial orientation and the subsequent securement of the manifold 22 against the end bell 20 axially secures the sealing mechanism 10 in position. An o-ring 82 is positioned between the second seal head 76 and the manifold 22, and another o-ring 84 is positioned between the seal plate 50 and manifold 22 to complete the seal between the sealing mechanism 10 and the manifold 22. An o-ring 86 is also provided between the terminal end 88 of the pitot tube assembly 12 and the manifold 22. The manifold 22 is secured to the pitot tube assembly 12 by means such as screws 90, which also axially secures the pitot tube assembly 12 and the sealing mechanism 10.

Seal assemblies or sealing mechanisms differ between styles and manufactures of pumps; however, the sealing mechanism 10 of FIG. 1 is illustrative of the general fact that known pump seal systems comprise a plurality of parts that render the prior seal systems costly and difficult to assemble and replace when damaged. That is, prior art seal system design, as exemplified by the one illustrated in FIG. 1, requires extra parts, such as the seal plate to mount the first seal head and the seal hub to mount the seal mating ring. The system design also requires a lock nut, additional o-rings and a diffuser ring. The time it takes to assemble those parts together and to assure that all elements are properly aligned to provide a competent seal is time-consuming and, therefore, costly.

In-line sealing mechanisms, such as the one shown in FIG. 1, where the seals are axially aligned in adjacent or near-adjacent orientation, are subject to distortion of the seal elements, especially the diffuser ring and seal heads due, to the lockdown force of the seal hub nut and the heat generated by the first and second seal heads. Such distortion is particularly problematic when hard seal face materials are used, such as silicon carbide or tungsten carbide. In-line seal assemblies as exemplified by the illustration in FIG. 1 may also affect pump operation by increasing the net pump suction head (NPSH) of the pump as a result of the dimensions of the seal assembly.

Figure 2:
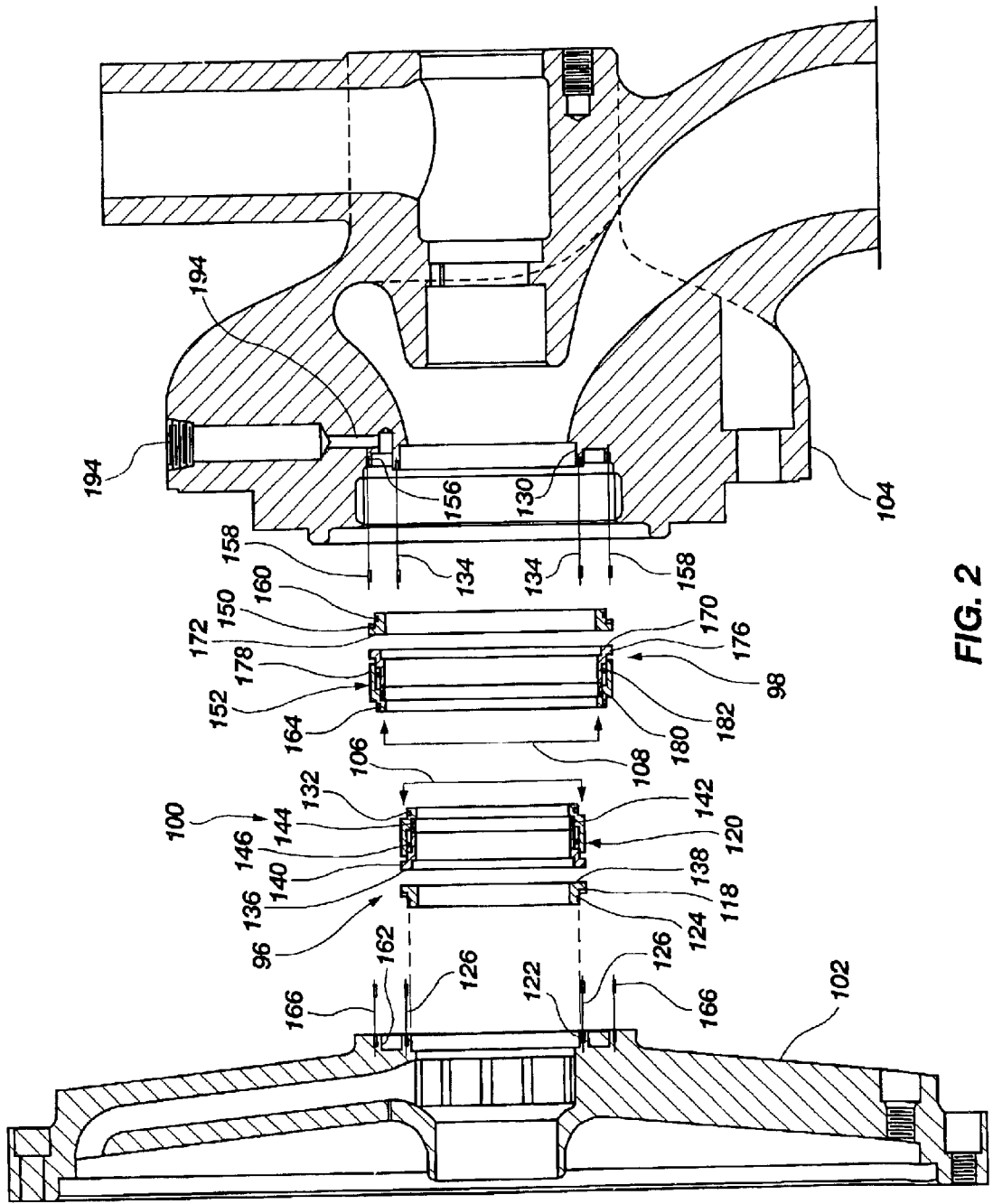
FIG. 2 is an exploded view in cross section of a portion of a pitot tube pump illustrating the seal assembly of the present invention.

The present invention eliminates the aforementioned concerns by providing a system of two coaxial seal members 96, 98 that are radially oriented relative to each other, rather than in axial alignment with each other. FIG. 2 generally illustrates, through an exploded view, the elements of the seal assembly 100 of the present invention, and the positioning of the seal assembly elements relative to the rotor cover 102 and pump casing, or manifold 104, of the pump. Extraneous elements of the pump, such as the pump casing end bell, rotor and pitot tube assembly are removed for simplification of illustration.

Figure 3:
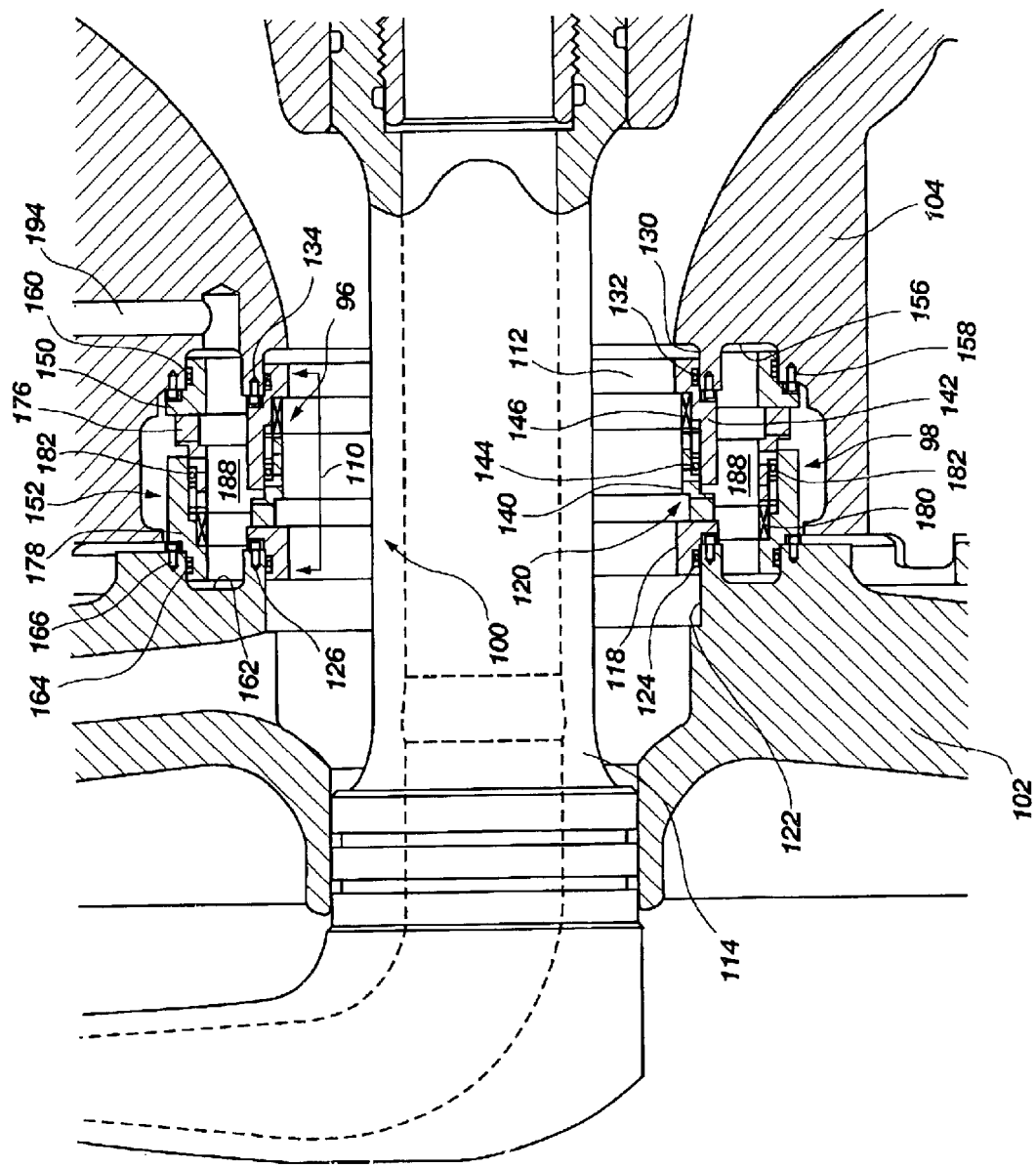
FIG. 3 is a view in cross section of the portion of pitot tube pump shown in FIG. 2 with the structural elements of the pump and seal assembly joined together in conventional configuration for use.

The seal assembly 100 of the present invention comprises a first seal member 96 and a second seal member 98 which are coaxial and radially oriented relative to each other. That is, the external diameter 106 of the first seal member 96 is less than the internal diameter 108 of the second seal member such that, when assembled as shown in FIG. 3, the first seal member 96 is positioned radially inwardly and coaxially with the second seal member 98. As a consequence of this configuration, the axial length 110 (FIG. 3) of the seal assembly is shorter than the axial seal length of prior "in-line" sealing mechanisms and the annular fluid channel 112 (FIG. 3) surrounding the pitot tube assembly 114 may be shorter. Pump operation is improved.

Additionally, the shorter axial length 110 of the seal assembly 100 enables use of a shorter pitot tube assembly 114 and allows the pump to be shorter in axial length as well. A shorter-length pump is not only more economical to manufacture, but allows the pump to be used in a greater number of pumping applications than longer-length pumps of the type known in the prior art.

It is preferred that, as shown in FIG. 3, the axial length of the first seal member 96 and the axial length of the second seal member 98 be substantially equal so that the first seal member 96 and second seal member 98 are essentially co-extensive in axial length (i.e., at 110) when assembled in the pump. The co-extensive axial lengths of the first seal member 96 and second seal member 98 provide an economy of seal assembly length 110, with the particular advantages previously described. However, the axial length of the first seal member 96 and the axial length of the second seal member 98 may vary, or the first seal member 96 and second seal member 98 may be positioned in the pump to be other than entirely co-extensive in axial length.

Referring again to FIG. 2, the first seal member 96 further comprises a seal mating ring 118 and an annular seal head 120. The seal mating ring 118 of the first seal member 96 is configured to be received in a recess 122 centrally formed in the rotor cover 102. An o-ring 124 encircles the seal mating ring 118 and is positioned between the seal mating ring 118 and the recess 122 of the rotor cover 102 to provide a seal therebetween. The seal mating ring 118 is fixed in registration with the rotor cover 102 so that the seal mating ring 118 does not rotate independently of the rotor cover 102, which is in rotation during operation of the pump. Any suitable device may be used to fix the seal mating ring 118 to the rotor cover 102, but drive pins 126 are illustrated as one exemplar device.

The seal head 120 of the first seal member 96 is configured to be received against an annular shoulder 130 centrally formed in the manifold 104 and encircling the annular fluid channel 112 (FIG. 3). An 0-ring 132 is positioned between the seal head 120 and the annular shoulder 130 to provide a seal therebetween. The seal head 120 is fixed to the manifold 104 to prohibit movement of the seal head 120 relative to the manifold 104 during operation. Any suitable device may be used to affix the seal head 120 to the manifold 104, but drive pins 134 are illustrated as one exemplar device.

When the pump is assembled, as illustrated in FIG. 3, the inner terminal annular surface 136 (FIG. 2) of the seal head 120 seats against the inner annular surface 138 (FIG. 2) of the seal mating ring 118. In operation, the seal mating ring 118 rotates with the rotor cover 102 and the seal head 120 remains stationary and affixed to the manifold 104.

In a particularly suitable embodiment of the present invention, the seal head 120 of the first seal member 96 may be further comprised of an inner seal head annulus 140 and an outer seal head annulus 142 which are interfittingly mated by, for example, friction fit. A spring 144 may be biased between the inner seal head annulus 140 and outer seal head annulus 142 to bias the seal head 120 between the seal mating ring 118 and the manifold 104, thereby enhancing the seal. An o-ring 146 may be positioned between the inner seal head annulus 140 and the outer seal head annulus 142 to provide a fluid seal therebetween.

As similarly described with respect to the first seal member 96, the second seal member 98 is further comprised of a seal mating ring 150 and a seal head 152. The seal mating ring 150 of the second seal member 98 is configured to be received in a circular recess 156 centrally formed in the manifold 104 and radially spaced from the annular shoulder 130. The seal mating ring 150 is fixed to the manifold 104 to prevent the seal mating ring 150 from moving relative to the manifold 104 when the pump is in operation. Any suitable device may be used to affix the seal mating ring 150 to the manifold 104, but drive pins 158 are illustrated as being an exemplar device. An o-ring 160 is positioned between the seal mating ring 150 and the circular recess 156 of the manifold 104 to provide a fluid seal therebetween.

The seal head 152 of the second seal member 98 is configured to be received in an outer circular recess 162 centrally formed in the rotor cover 102 and radially spaced from the inner circular recess 122 of the rotor cover 102. An 0-ring 164 is positioned between the seal head 152 and the outer circular recess 162 of the rotor cover 102 to provide a seal therebetween. The seal head 152 is fixed to the rotor cover 102 to prohibit rotational movement of the seal head 152 independently from the rotor cover 102 during operation; however, the seal head 152 rotates with the rotor cover 102 during operation of the pump. Any suitable device may be used to affix the seal head 152 to the rotor cover 102, but drive pins 166 are illustrated as an exemplar device.

When the pump is assembled, as illustrated in FIG. 3, the terminal annular surface 170 (FIG. 2) of the seal head 152 opposite the point of attachment of the seal head 152 to the rotor cover 102 seats against the inner annular surface 172 (FIG. 2) of the seal mating ring 150. In operation, the seal mating ring 150 remains stationary with the manifold 104 while the seal head 150 rotates with the rotor cover 102.

As described with respect to the seal head 120 of the first seal member 96, the seal head 152 of the second seal member 98, in a particularly suitable embodiment of the present invention, may be further comprised of an inner seal head annulus 176 and an outer seal head annulus 178 which are interfittingly mated by, for example, friction fit. A spring 180 may be biased between the inner seal head annulus 176 and outer seal head annulus 178 to bias the seal head 152 against the seal mating ring 150 of the second seal member 98 and the rotor cover 102 to thereby enhance the seal. An o-ring 182 may be positioned between the inner seal head annulus 176 and the outer seal head annulus 178 to provide a fluid seal therebetween.

As best shown in FIG. 3, when the seal assembly 100 of the present invention is positioned in the pump, the second seal member 98 is, most suitably, radially spaced from the first seal member 96, thereby providing an intraseal fluid channel 188 between the first seal member 96 and second seal member 98. A seal flush port 194 (FIG. 2) formed in the manifold 104 is positioned to be in fluid communication with the intraseal fluid channel 188 (FIG. 3) to deliver flushing fluid, such as ethylene glycol, to the first seal member 96 and second seal member 98. The radially oriented seal members 96, 98 of the present invention provide for a more efficient means of flushing the seals to keep the seals cooled and lubricated during operation of the pump.

While the seal mating ring 118 of the first seal member 96 is illustrated as being attached to the rotor cover 102 of the pump and the seal head 120 of the first seal member 96 is illustrated as being attached to the manifold 104, it is equally as possible to configure the seal mating ring 118 for attachment to the manifold 104 and configure the seal head 120 for attachment to the rotor cover 102. The same is true with respect to reversing the attachment of the seal mating ring 150 and seal head 152 of the second seal member 98 to the manifold 104 and rotor cover 102 from the order previously described above.

The coaxial and radially oriented seal assembly of the present invention is adaptable to a variety of rotary, and particularly centrifugal, pumps to prevent infiltration of fluid from the rotating elements of the pump to the stationary elements of the pump. The seal assembly of the present mechanism provides for improved pump operation parameters, and allows the pump to be made more economically because the need to skillfully assemble and align a plurality of parts is eliminated. A pump containing the seal assembly of the present invention is adaptable to a wider variety of applications. Thus, reference herein to the specific details of the structure and function of the invention is by way of reference only and not by way of limitation. Those skilled in the art will recognize that changes may be made to the invention to adapt it to a variety of applications.

What is claimed is:

1. A pump seal assembly for centrifugal pumps, comprising:
    a first seal member structured for positioning in a fluid pump between a rotating element and a non-rotating element of the pump, said first seal member having a first axial end connected to a rotating element of the pump and a second axial end connected to a non-rotating element of the pump; and
    a second seal member structured for positioning in a fluid pump between a rotating element and a non-rotating element of the pump, said second seal member having a first axial end connected to a rotating element of the pump and a second axial end connected to a non-rotating element of the pump, said second seal member being coaxial with and radially oriented relative to said first seal member.

2. The pump seal assembly of claim 1 wherein said second seal member has an internal diameter and said first seal member has an external diameter the dimension of which is less than said internal diameter of said second seal member.

3. The pump seal assembly of claim 2 wherein said first seal member and said second seal member are sized in axial length to be substantially co-extensive.

4. The pump seal assembly of claim 2 wherein said second seal member is radially spaced from said first seal member to provide a fluid channel therebetween.

5. A fluid pump having a stationary pump casing, a rotating element housed within said pump casing and positioned to rotate relative to said pump casing, a drive means for moving said rotating element, a fluid inlet positioned to deliver fluid to said rotating element for processing fluid, an outlet positioned to remove processed fluid from the pump and a seal assembly positioned between the rotating element and the stationary pump casing, said seal assembly comprising a first seal member and a second seal member positioned coaxially with and radially spaced from said first seal member, each said first seal member and said second seal member having a first axial end and a second axial end connected to one of said rotating element or said stationary pump casing.

6. The fluid pump of claim 5 wherein said first seal member and said second seal member are radially spaced from each other providing a fluid channel therebetween, and wherein said fluid pump is further configured with a seal flush port in fluid communication with said fluid channel.

7. The fluid pump of claim 5 wherein said second seal member has an internal diameter and said first seal member has a external diameter the dimension of which is less than said internal diameter of said second seal member.

8. The fluid pump of claim 7 wherein said first seal member and said second seal member each comprise a seal mating ring and a seal head configured to register against said seal mating ring.

9. The fluid pump of claim 8 wherein said seal mating ring of said first seal member is configured for securement to the rotating element of said fluid pump and said seal head of said first seal member is configured for securement to said stationary pump casing, and further wherein said seal mating ring of said second seal member is configured for securement to a stationary element of said pump casing of said fluid pump and said seal head of said second seal member is configured for securement to said rotating element of said fluid pump.

10. The fluid pump of claim 5 wherein said rotating element of said fluid pump is a rotor and said first seal member is positioned to encircle a pitot tube assembly positioned through said rotor.

11. The fluid pump of claim 10 wherein said fluid pump further comprises a manifold as part of the pump casing and wherein said second seal member is positioned adjacent the manifold of said pump casing.

12. A pump seal assembly for centrifugal pumps, comprising:
    a first seal member structured for positioning in a fluid pump between a rotating element and a non-rotating element of the pump and being further comprised of a seal mating ring and a seal head positioned to register against said seal mating ring; and
    a second seal member structured for positioning in a fluid pump between a rotating element and a non-rotating element of the pump, said second seal member being further comprised of a seal mating ring and a seal head positioned to register against said seal mating ring of said second seal member, said second seal member being coaxial with and radially oriented relative to said first seal member.

13. The pump seal assembly of claim 12 wherein said seal mating ring of said first seal member is connected to the rotating member of the pump and said seal mating ring of said second seal member is connected to the non-rotating member of the pump.

14. The pump assembly of claim 12 further comprising a seal face between each said seal mating ring and said seal head of each of said first seal member and said second seal member, and further wherein the seal face of said first seal member is substantially axially distanced from said seal face of said second seal member.

15. The pump seal assembly of claim 12 wherein said seal mating ring of said first seal member is configured for securement to the rotating element of a fluid pump and said seal head of said first seal member is configured for securement to a stationary element of the fluid pump.

16. The pump seal assembly of claim 15 wherein said seal mating ring of said second seal member is configured for securement to a stationary element of a fluid pump and said seal head of said second seal member is configured for securement to the rotating element of the fluid pump.

17. The pump seal assembly of claim 12 wherein said seal head of said first seal member and said seal head of said second seal member are each further comprised of an inner seal head annulus and an outer seal head annulus matingly fitted together.

18. The pump seal assembly of claim 17 wherein said matingly fitted inner seal head annulus and said outer seal head annulus are spring biased relative to each other.

* * * * *